United States Patent
Fischer et al.

(10) Patent No.: US 11,658,954 B2
(45) Date of Patent: May 23, 2023

(54) PAIRING METHOD BETWEEN A MULTIMEDIA UNIT AND AT LEAST ONE OPERATOR, MULTIMEDIA UNIT, OPERATOR AND PERSONALIZATION ENTITY FOR THE IMPLEMENTATION OF THIS METHOD

(71) Applicant: NAGRAVISION S.A., Cheseaux-sur-Lausanne (CH)

(72) Inventors: Nicolas Fischer, Versoix (CH); Brecht Wyseur, Penthalaz (CH); Jean-Bernard Fischer, Rochejean (FR); Marco Macchetti, Casnate con Bernate (IT)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 50 days.

(21) Appl. No.: 16/446,820

(22) Filed: Jun. 20, 2019

(65) Prior Publication Data
US 2020/0045030 A1    Feb. 6, 2020

Related U.S. Application Data (63) Continuation of application No. 15/044,971, filed on Feb. 16, 2016, now abandoned.

(30) Foreign Application Priority Data

Feb. 17, 2015 (EP) .................................. 15155391

(51) Int. Cl.
*H04L 29/06* (2006.01)
*H04L 9/40* (2022.01)
(Continued)

(52) U.S. Cl.
CPC .......... *H04L 63/061* (2013.01); *H04L 9/0844* (2013.01); *H04L 9/0847* (2013.01);
(Continued)

(58) Field of Classification Search
CPC ..... G06F 21/602; H04L 63/06; H04L 63/061; H04L 63/0428; H04L 9/14;
(Continued)

(56) References Cited

U.S. PATENT DOCUMENTS 5,150,411 A * 9/1992 Maurer ................ H04L 9/0844
380/282
5,601,435 A * 2/1997 Quy ...................... G16H 40/67
434/307 R
(Continued)

FOREIGN PATENT DOCUMENTS

EP         0 482 233         4/1992

OTHER PUBLICATIONS

European Search Report issued in EP 15 15 5391 dated Jul. 22, 2015.
(Continued)

*Primary Examiner* — Dao Q Ho
(74) *Attorney, Agent, or Firm* — Hoyng Rokh Monegier B.V.; David P. Owen (57) ABSTRACT

The present invention relates in particular to a pairing method between a multimedia unit and one operator having an operator identifier, the multimedia unit having a multimedia unit identifier and receiving conditional access data from said operator, the method being characterized in that:
receiving by the multimedia unit a multimedia unit key formed by applying a first cryptographically function to a personalization key and to the multimedia unit identifier;
receiving by the operator an operator key formed by applying a second cryptographically function to said personalization key and to the operator identifier;
(Continued)

said multimedia unit further having a function of the multimedia unit and said operator further having a function of the operator, these functions being such that the result of the application of the function of the operator to said operator key and to said multimedia unit identifier is equal to the result of the application of the function of the multimedia unit to said multimedia unit key and to said operator identifier, this result forming a pairing key between said multimedia unit and said operator.

12 Claims, 3 Drawing Sheets

(51) Int. Cl.
*H04L 9/14* (2006.01)
*H04N 21/2347* (2011.01)
*H04N 21/426* (2011.01)
*H04N 21/254* (2011.01)
*H04N 21/4627* (2011.01)
*H04N 21/6334* (2011.01)
*H04L 9/08* (2006.01)

(52) U.S. Cl.
CPC ........... *H04L 9/14* (2013.01); *H04N 21/2347* (2013.01); *H04N 21/2541* (2013.01); *H04N 21/42623* (2013.01); *H04N 21/4627* (2013.01); *H04N 21/6334* (2013.01); *H04L 2209/24* (2013.01)

(58) Field of Classification Search
CPC . H04L 63/0435; H04L 9/0816; H04L 9/0838; H04L 9/0847; H04L 9/0866; H04L 9/08; H04L 9/01; H04L 9/0844
See application file for complete search history.

(56) References Cited

U.S. PATENT DOCUMENTS

| 7,007,164 | B1* | 2/2006 | Euchner | H04L 9/0844 380/284 |
|---|---|---|---|---|
| 2002/0077078 | A1 | 6/2002 | Antti | |
| 2006/0174110 | A1* | 8/2006 | Strom | G06F 21/10 713/165 |
| 2010/0138668 | A1* | 6/2010 | Tsuria | H04L 9/0866 340/5.83 |
| 2010/0246819 | A1* | 9/2010 | Candelore | H04N 21/8186 380/210 |
| 2011/0078722 | A1* | 3/2011 | Wendling | H04N 21/26606 725/31 |
| 2013/0129087 | A1 | 5/2013 | Qi et al. | |
| 2013/0259268 | A1* | 10/2013 | Zhou | H04R 3/12 381/120 |
| 2016/0154744 | A1* | 6/2016 | Zheng | H04L 9/3247 713/193 |

OTHER PUBLICATIONS

Junbeom Hur et al., "Privacy-Preserving Identity-Based Broadcast Encryption", Information Fusion, vol. 13, pp. 296-303 (2012).
A. Menezes et al., "Handbook of Applied Cryptography", CRC Press, pp. 489-541, Copyright 1996.
Jeong-Hyun Park et al., "Key Distribution for Secure VSA T Satellite Communications", IEEE Transactions on Broadcasting, vol. 44, No. 3, pp. 274-277, Sep. 1998.
Ya-ling Zhang et al., "An ID-Based Broadcast Encryption Scheme for Collaborative Design", 2009 International Conference on Networks Security, Wireless Communications and Trust.

* cited by examiner

PAIRING METHOD BETWEEN A MULTIMEDIA UNIT AND AT LEAST ONE OPERATOR, MULTIMEDIA UNIT, OPERATOR AND PERSONALIZATION ENTITY FOR THE IMPLEMENTATION OF THIS METHOD

TECHNICAL DOMAIN

The present disclosure relates to a pairing method between at least one operator and a multimedia unit, this pairing being aimed at protecting data transmitted by the operator to the multimedia unit. It also relates to an operator and a multimedia unit allowing the implementation of the method as well as a system formed by at least one such operator and at least one such multimedia unit. It further relates to a personalization entity participating in the implementation of this method.

This disclosure applies in the first place to the context of a transmission system of the "broadcast" type i.e. to a transmission mode in which content is transmitted to one or more multimedia units by means of a one-way communication channel. This kind of communication corresponds to the one currently used in a classic pay-TV system where data is transmitted by satellite, by radio waves or by cable networks without feedback channel, and where the multimedia units receive the information without possibility to interact with the transmitter or the operator.

The invention can be also applied to a multicast-type transmission system, and even a point-to-point transmission system (unicast).

According to one embodiment of the invention, the multimedia units may not have the possibility to transmit data or information to the operator, or on the contrary, the multimedia units may be able to transmit certain data to the operator, in particular by means of a feedback channel.

More particularly, one aspect of the disclosure relates to a pairing method between a multimedia unit and at least one operator, the multimedia unit being intended to receive conditional access data from said operator, the multimedia unit having a multimedia unit identifier, the operator having an operator identifier.

Another aspect of the disclosure relates to a multimedia unit intended to be paired with at least one operator, this multimedia unit having a multimedia unit identifier.

Another aspect of the disclosure relates to an operator intended to be paired with at least one multimedia unit, this operator having an operator identifier.

The present disclosure also relates to a system for access to conditional access data.

This disclosure further relates to a personalization entity in charge of pairing at least one operator and at least one multimedia unit.

PRIOR ART

As it is well known, many operators are currently in charge of distributing conditional access content or protected content made available to users by means of multimedia units. Each user can have several receivers or multimedia units such as smartphones, tablets, laptops or TV receivers for example. The explosion in the number of receiver devices or multimedia units poses a certain number of problems to the operators.

Currently, in a transmission environment of the "broadcast" type, each multimedia unit is dedicated to a given operator. This is known as vertical market. A multimedia unit is specifically personalized for this operator or paired with this operator and contains cryptographic means (algorithms, keys) specific to this operator.

The pairing between a multimedia unit and a specific operator takes place in the following way. When a supplier of Conditional Access Systems (CAS) wishes to have multimedia units produced and secured, in the first place they make the electronic modules (chipsets) be produced. These electronic modules are personalized by the manufacturer by means of secret data which is provided by the conditional access system supplier.

The conditional access system supplier makes electronic modules be produced which could be associated to an operator among a plurality of operators, and as the operator to which a specific electronic module will be finally associated is not known at the moment of the personalization of the electronic module, the conditional access system supplier personalizes the modules with data which are specific to them and totally independent of the operators.

The pairing of the multimedia unit with the operator can be made in two different ways: either at the production of the multimedia unit, or during its initialisation by the final user.

In the first case, once the electronic modules are personalized, they are transmitted to the manufacturer of multimedia units for being integrated into their units. At this stage, each multimedia unit will be associated to a specific operator so that it will be able to treat only information coming from this operator. For this purpose, the manufacturer of multimedia units has to personalize each multimedia unit according to the intended operator. In other words, the multimedia unit and the operator have to be paired.

In order to do this, the supplier of the conditional access system has to deliver data specific to the operator, in particular unique and global keys of this operator, for all the multimedia units intended to the concerned operator, in order to allow the operator to subsequently send data and content to these multimedia units in a secure way. This implies delivering, to the manufacturer of multimedia units, all the "operator data" encrypted for each of the electronic modules, which represents huge quantities of data. Alternatively, it is possible to supply an autonomous unit such as a security hardware module known under the name Hardware Security Module HSM, which can produce the data on the fly. This option has the drawback of exposing the algorithms and the keys of the conditional access system supplier if the security of the hardware security module is compromised.

In order to reduce the quantity of data to be transmitted during the personalization of the multimedia units, it would be advantageous to be able to produce these multimedia units without secret data of an operator and allow an operator to personalize the multimedia units remotely by using for example the transmission channel which is generally available to them.

In the second case, i.e. if the multimedia unit is paired with the operator during initialisation of the multimedia unit at the final user premises, the operator is the one carrying out the personalization of the multimedia units through its transmission system. In order to do this, the operator has to know the secret data which allows the personalization of the multimedia units in the same way as the manufacturer of multimedia units in the previous case, which poses two problems to the supplier of the conditional access system:
   on the one hand, the supplier has to deliver to the operator a huge quantity of data, as they used to with the manufacturer of the multimedia units;

on the other hand, they have to ensure that only the multimedia units bought by a specific operator work at this specific operator and that no other operator can use them.

The latter point is assured by the manufacturer in the conventional multimedia units, as it is the manufacturer who sells the units already personalized to the operator. A multimedia unit can only contain the data of one single operator and has to leave the manufacturer for being delivered to the chosen operator, this multimedia unit being paired only with this given operator.

From the moment when the multimedia unit is no longer paired in a specific way with a determined operator before being placed on the market, all the operators can personalize all the multimedia units produced. This entails a risk of theft, as stolen multimedia units can be also used by any other operator.

In order to obviate this risk, the conditional access system supplier has to transmit the personalization secret data to a given operator only for the units this operator has effectively bought from said manufacturer. This implies to list individually each unit produced for a given operator. This poses the problem to trace exactly the delivery of multimedia units and imposes delays. Indeed, when a multimedia unit is delivered to an operator, the latter orders keys from the conditional access system supplier who delivers them to the operator. This can involve a waiting time of several days between the moment when the multimedia units are delivered and the moment when the related keys are at the operator and are operational in order to allow the use of the multimedia units. This also forbids the use of a hardware security module (HSM) which would be able to address all the multimedia units.

In a horizontal market, the user buys a multimedia unit and calls an operator to activate this unit. It is not acceptable that the user should wait several days for activating the multimedia unit due to the time of delivery of the keys relating to the operator by the conditional access system supplier. Therefore it is necessary that all the necessary keys be delivered beforehand to the operator. This represents a huge quantity of key as all the keys of all electronic modules produced are needed, and not only the keys of the multimedia units produced for this operator, as any multimedia unit could potentially be used with this operator. Alternatively, a hardware security module (HSM) dedicated to the operator can be used for generating the keys based on the identifier of the multimedia unit.

Moreover, it is important that the conditional access system supplier forbids an operator to be able to "attack" another operator. According to a preferred embodiment, the means available to an operator do not allow to intervene on another operator, even if the operator is capable of compromising the equipment of the conditional access system supplier installed at their home.

In the case when we use keys by the conditional access system supplier to the operator, this conditional access system supplier can make sure that the delivered keys are different for each operator and that it is not possible to find the keys for another operator from the one received for this operator.

If a hardware security module (HSM) is used for generating keys from the identifier of the multimedia units, this hardware module contains an operator identifier to generate different keys for each operator. The algorithm of generation of these keys is an essential secret for the conditional access system supplier. If the hardware security module is compromised and the generation algorithm of keys is unveiled, it becomes possible for a given operator to know and use the keys of all operators and of all the multimedia units.

One aspect of the present disclosure intends to solve the above mentioned problems by offering a method which allows a conditional access system supplier to produce generic multimedia units, i.e. not initially connected to a particular operator, and allowing an operator to personalize these multimedia units remotely. This method according to the present disclosure further allows ensuring security between operators, namely the knowledge which could be acquired at an operator does not give information concerning another operator.

This method allows to securely attribute a different key to each combination of multimedia unit and operator by exchanging only public identifiers.

DESCRIPTION OF THE INVENTION

In the frame of the present disclosure, it is proposed a pairing method between a multimedia unit and at least one operator, this method being such as defined in the preamble and characterized in that:
the multimedia unit receives a multimedia unit key formed by applying a first secure cryptographically function on a combination of a personalization key and the multimedia unit identifier;
the operator receives an operator key formed by applying a secure second cryptographically function on a combination of said personalization key and the operator identifier;
said multimedia unit further having a multimedia unit function and said operator further having an operator function, these functions being such that the result of the application of the operator function to said operator key and to said multimedia unit identifier is equal to the result of the application of the multimedia unit function to said multimedia unit key and to said operator identifier, this result forming a pairing key between said multimedia unit and said operator.

According to the present disclosure, it is proposed a multimedia unit such as defined in the preamble and characterized in that, it is configured to:
generate a multimedia unit key generated by applying a first secure cryptographically function to a personalization key and to the multimedia unit identifier;
apply a multimedia unit function calculated with said multimedia unit key and to an identifier of said operator, the result of the calculation if this multimedia unit function with said multimedia unit key and to the identifier of said operator resulting in a pairing key between said multimedia unit and said operator.

According to the present disclosure, it is proposed an operator as defined in the preamble and characterized in that:
forming an operator key by applying a second cryptographically secure function to a personalization key and to the operator identifier;
calculating, based on an operator function, with a calculation module, said operator function being applied to said operator key and to an identifier of said at least one multimedia unit with which said operator is intended to be paired, the application of this operator function to said operator key and to the identifier of said at least one multimedia unit with which said operator is intended to be paired resulting in a pairing key between said multimedia unit and said operator.

According to the present disclosure, it is proposed a system for accessing conditional access data, characterized in that said data is transmitted to at least one multimedia unit by at least one operator to which said multimedia unit is to be paired with, the multimedia unit having a multimedia unit identifier, the operator having an operator identifier, the system being characterized in that:

the multimedia unit has a multimedia unit key formed by applying a first cryptographically secure function to a personalization key and to the multimedia unit identifier;

the operator has an operator key formed by applying a second cryptographically secure function to said personalization key and to the operator identifier;

said multimedia unit further has a multimedia unit function and said operator further has an operator function, these multimedia unit and operator functions being such that the result of the application of the operator function to said operator key and to said multimedia unit identifier is equal to the result of the application of the multimedia unit function (f2) to said multimedia unit key and to said operator identifier, this result forming a pairing key between said multimedia unit and said operator.

According to the present disclosure, it is proposed a personalization entity in charge of pairing at least one operator and at least one multimedia unit, characterized in that this personalization entity has a personalization key, an identifier of said multimedia unit to be paired, an identifier of said operator to be paired, a first cryptographically secure function and a second cryptographically secure function, and calculation means arranged for calculating a multimedia unit key by applying said first cryptographically secure function to said personalization key and to said multimedia unit identifier, and for calculating an operator key by applying said second cryptographically secure function to said personalization key and to said operator identifier.

The present disclosure can be used in a configuration in which the multimedia unit has no feedback channel or automatic communication means allowing the transmission of information towards the operator. In this case, it is possible to communicate the multimedia unit identifier by phone. In this configuration, it is preferable that the multimedia unit identifier can be easily transmitted by phone by a user to a call centre of the operator.

According to an embodiment, the identifier of the multimedia unit can be communicated to the operator by different channels, for example by e-mail, by introduction on a dedicated website of the operator, by communication with a communication device such as a mobile phone, a touchpad, . . . According to an embodiment, the identifier is locally read by reading with or without contact by a communication device such as a mobile phone, then transmitted by a network such as a GSM network. The identifier can in particular be in the form of alphanumeric character string, in the form of bar code, or QR code.

The operator receives, from the conditional access system supplier, a unique operator identifier and a specific operator key related to this identifier. The calculation method of the specific key of the operator uses secret data that only the conditional access system supplier possesses. Likewise, during the personalization of the electronic module of the multimedia device, the multimedia unit receives from the conditional access system supplier, a unique multimedia unit identifier and a specific key connected to this multimedia unit identifier. The calculation method of the specific key of the multimedia unit also uses secret data that only the conditional access system supplier possesses.

When the identifier of the multimedia unit is transmitted to the operator with which this multimedia unit has to be paired with, this operator can calculate a pairing key.

Symmetrically, when the multimedia unit receives the identifier of the operator it has to be paired with, this multimedia unit can calculate the same pairing key. Moreover, the pairing key obtained is unique for the couple multimedia unit—operator. It is to be noted that a multimedia unit using a single key can thus share a unique key with any operator and vice versa.

In order to realize a pairing in a satisfying way it is important that at least certain of the functions used during the calculation of the pairing key be cryptographically secure, failing which the pairing will be not very secure. The expression "cryptographically secure" means here that if the pairing key is formed by an operation or function applied to a personalization key and to an identifier, the knowledge of the identifier and of the result of the combination does not allow to easily deducing the personalization key, or the result of the combination for another identifier.

The secure cryptographic encryption functions known under the acronyms DES or AES meet this definition of "cryptographically secure", but they do not allow generating the same pairing key at the operator and in the multimedia unit.

The method according to one of the aspects of the invention allows to attribute different and independent keys to each operator. In this way, the security of an operator is independent of the security of the other operators and compromising a key of one operator has no effect on the security of the other operators.

According to the method of the invention, it is possible to pair several operators with the same multimedia unit without jeopardizing the security related with an operator because of the pairing with another or more of the other operators. In order to realize this multiple pairing, it is sufficient to apply the method for each different operator concerned.

BRIEF DESCRIPTION OF THE DRAWINGS

This invention and its advantages will be better understood with reference to the annexed figures and to the detailed description of a particular embodiment, in which.

WAYS OF REALISING THE INVENTION

Figure 1:
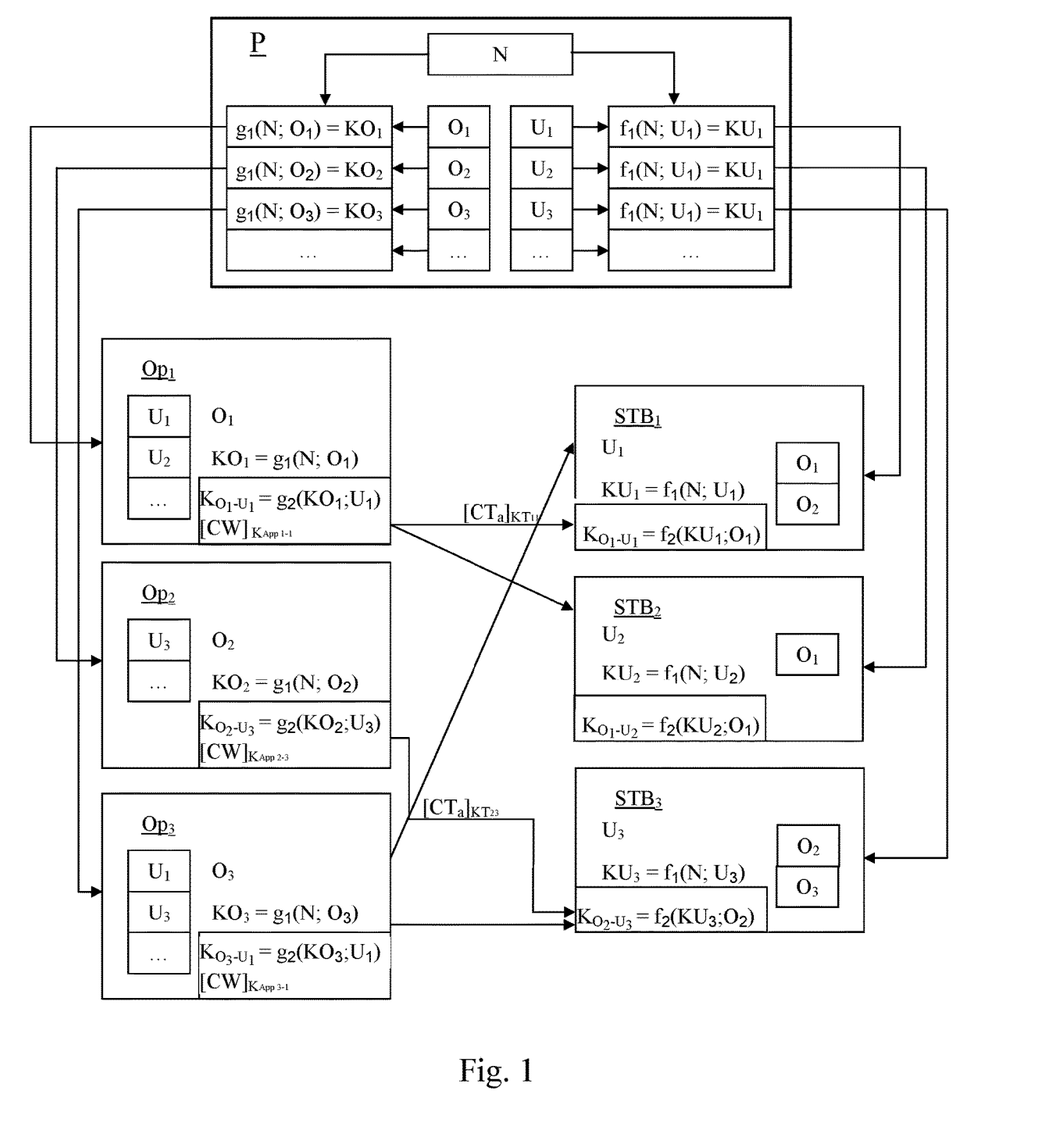
FIG. 1 represents the system according to this invention.

FIG. 1 represents the different entities used within the context of the present disclosure and for the implementation of the method according to this disclosure.

In the particular example disclosed, three different operators have been represented. These operators are indicated respectively as $Op_1$, $Op_2$, and $Op_3$. Three multimedia units have also been represented and carry the references $STB_1$, $STB_2$, and $STB_3$. All these multimedia units and all the operators are connected to a personalization entity P.

The personalization entity P has a secret personalization key N which is not transmitted to any other entity. This personalization entity further has a list of identifiers corresponding on the one hand to an identifier $O_{ID}$ specific to each operator Op and on the other hand, to an identifier $U_{ID}$ specific to each STB multimedia unit.

The identifier specific to each multimedia unit, indicated $U_{ID}$, can be introduced into these multimedia units during their personalization by the manufacturer of electronic modules (Chipset). In a similar way, each operator has a specific identifier, indicated with $O_{ID}$, which is transmitted to them by the personalization entity. This personalization entity has calculation means allowing it to process the operator identifier $O_{ID}$ as explained below, in order to allow this operator to transfer conditional access content to a multimedia unit managed by this personalization entity.

It should be noted that the personalization of a multimedia unit is done independently of the operator or operators this multimedia unit communicates with. In most cases, the personalization is made before knowing which operator this multimedia unit will be associated to. According to the invention, it is possible to associate a multimedia unit simultaneously with several operators.

During the personalization of a multimedia unit, the calculation means of the personalization entity P calculates a multimedia unit key $KU_{ID}$, this key being obtained by applying a first cryptographically secure mathematical function, noted $f_1$, to the personalization key N and to the multimedia unit identifier $U_{ID}$. We have $KU_{ID}=f_1(N; U_{ID})$ or for example $KU_1=f_1(N_1, U_1)$ for the multimedia unit $STB_1$ having $U_1$ as identifier. The key thus obtained is transmitted to the concerned multimedia unit. This transmission is done in principle during the personalization, i.e. when the couple $(U_{ID}; KU_{ID})$ is stored in the multimedia unit, but it could also be made subsequently, for example by transmission in a protected message. When the couple $(U_{ID}; KU_{ID})$ is stored in the multimedia unit during the personalization, it is easy for the personalization entity to supply beforehand a long list of couples $(U_{ID}; KU_{ID})$ to the manufacturer of multimedia units.

The mathematical function used for forming the multimedia unit key $KU_{ID}$ from the identifier $U_{ID}$ of this multimedia unit and from the personalization key N or said first mathematical function $f_1$ preferably has particular properties. These properties are such that:

the knowledge of the multimedia unit key $(KU_{ID})$ and the multimedia unit identifier $(U_{ID})$ does not allow to calculate the personalization key (N);

the knowledge of a first multimedia unit key $(KU_{ID})$ calculated for a multimedia unit having a first multimedia unit identifier $(U_{ID})$ does not allow to calculate a second multimedia unit key $(KU_{ID*})$ for a multimedia unit having a second multimedia unit identifier $(U_{ID*})$ different from said first multimedia unit identifier $(U_{ID})$;

the knowledge of the multimedia unit identifier $(U_{ID})$ without knowing the personalization key (N) does not allow to calculate the multimedia unit key $(KU_{ID})$.

With these properties, it is possible to make the identifier $U_{ID}$ of the multimedia unit public without risking to compromise the key of this multimedia unit $KU_{ID}$ and/or the personalization key N.

The personalization entity P also has the identifier of the operators this entity cooperates with. This identifier $O_{ID}$ can be public. The personalization entity P calculates an operator key $KO_{ID}$ by applying a second mathematical function, noted $g_1$, cryptographically secure, to the personalization key N and to the operator identifier $O_{ID}$. Thus we have $KO_{ID}=g_1(N; O_{ID})$ or for example for the operator $Op_1$, $KO_1=g_1(N; O_1)$. This function $g_1$ has the same properties as the function $f_1$, namely that:

the knowledge of the operator key $(KO_{ID})$ and of the operator identifier $(O_{ID})$ does not allow to calculate the personalization key (N);

the knowledge of a first operator key $(KO_{ID})$ calculated for an operator having a first operator identifier $(O_{ID})$ does not allow to calculate a second operator key $(KO_{ID*})$ for an operator having a second operator identifier $(O_{ID*})$ different from said first operator identifier $(O_{ID})$;

the knowledge of the operator identifier $(O_{ID})$ without knowing the personalization key (N) does not allow to calculate the operator key $(KO_{ID})$.

These properties correspond to the characteristic "cryptographically secure".

The operator keys $KO_{ID}$ calculated by the personalization entity are then delivered to the concerned operators in a confidential way. At this stage each operator has their identifier $O_{ID}$ and their operator key $KO_{ID}$, calculated and transmitted by the personalization entity P.

Finally, for the multimedia unit and the operator to be able to communicate in a secure way, they must be able to deduce a common key from confidential information they have and from the public information of the other entity.

Thus, the operator should be able to calculate a unique key $K_{O_{ID}-U_{ID}}$ called pairing key. This pairing key is calculated by applying a cryptographically secure operator function $g_2$ to the operator key $KO_{ID}$ and to the multimedia unit identifier $U_{ID}$ this operator has to be paired with. Thus we have $K_{O_{ID}-U_{ID}}=g_2(KO_{ID}; U_{ID})$ or for example for the operator $Op_1$ and the multimedia unit $U_1$, $K_{O_1-U_1}=g_2(KO_1; U_1)$. This operator function $g_2$ has the same properties as the first function $f_1$. More precisely, the cryptographically secure operator function $g_2$ is such that:

the knowledge of the pairing key $(K_{O_{ID}-U_{ID}})$ and of the multimedia unit identifier $(U_{ID})$ does not allow to calculate the operator key $(KO_{ID})$;

the knowledge of a first pairing key $(K_{O_{ID}-U_{ID}})$ calculated for a multimedia unit having a first multimedia unit identifier $(U_{ID})$ and an operator having a first operator key $KO_{ID}$ does not allow to calculate a second pairing key $(K_{O_{ID*}-U_{ID*}})$ for a multimedia unit having a second multimedia unit identifier $(U_{ID*})$ different from said first multimedia unit identifier $(U_{ID})$ and/or an operator having a second operator key $KO_{ID*}$ different from said first operator key $KO_{ID}$;

the knowledge of the multimedia unit identifier $(U_{ID})$ without knowing the operator key $(KO_{ID})$ does not allow to calculate the pairing key $(K_{O_{ID}-U_{ID}})$;

the knowledge of said operator key $KO_{ID}$ without knowing the multimedia unit identifier $U_{ID}$ does not allow to calculate the pairing key $(K_{O_{ID}-U_{ID}})$.

These properties correspond to the characteristic "cryptographically secure".

Symmetrically, it is necessary that the multimedia unit be able to calculate the same unique key $K_{O_{ID}-U_{ID}}$ by applying a cryptographically secure multimedia unit function $f_2$ to its key $KU_{ID}$ and to the identifier of the operator $O_{ID}$ it has to be paired with. Thus we have $K_{O_{ID}-U_{ID}}=f_2(KU_{ID}, O_{ID})$ or for example for the operator $Op_1$ and the multimedia unit $U_1$, $K_{O_1-U_1}=f_2(KU_1, O_1)$. This multimedia unit function $f_2$ has the same properties as the operator function $g_2$. More precisely, the function of the multimedia unit $f_2$ is such that:

the knowledge of the pairing key $(K_{O_{ID}-U_{ID}})$ and of the operator identifier $(O_{ID})$ does not allow to calculate the key of the multimedia unit $(KU_{ID})$;

the knowledge of a first pairing key $(K_{O_{ID}-U_{ID}})$ calculated for an operator having a first operator identifier $(O_{ID})$ and a multimedia unit having a first multimedia unit key $KU_{ID}$ does not allow to calculate a second pairing key $K_{O_{ID}-U_{ID}}$ for an operator having a second operator identifier ($O_{ID*}$) different from said first operator identifier ($O_{ID}$) and/or a multimedia unit having a second multimedia unit key $KU_{ID*}$ different from said first multimedia unit key;

the knowledge of the operator identifier ($O_{ID}$) without knowing the multimedia unit key ($KU_{ID}$) does not allow to calculate the pairing key ($K_{O_{ID}-U_{ID}}$);

the knowledge of the multimedia unit key $KU_{ID}$ without knowing the operator identifier $O_{ID}$ does not allow to calculate the pairing key ($K_{O_{ID}-U_{ID}}$).

These properties correspond to the characteristic "cryptographically secure".

The mathematical functions used in the present invention should meet the following condition, expressed in mathematical form:

$$g_2(g_1(A;C);B)=f_2(f_1(A;B);C)$$

where $f_1$ is said first cryptographically secure function; $g_1$ is said second cryptographically secure function; $f_2$ is said multimedia unit function, $g_2$ is said operator function, and A, B, and C are entry variables of these functions.

Using the references used in the present disclosure, this condition means that:

$$g_2(g_1(N;O_{ID});U_{ID})=f_2(f_1(N;U_{ID});O_{ID})$$

If this condition is met, we will have:

$$K_{O_{ID}-U_{ID}}=g_2(KO_{ID};U_{ID})=g_2[g_1(N;O_{ID});U_{ID}]=f_2[f_1(N;U_{ID});O_{ID}]=f_2(KO_{ID};O_{ID})=K_{O_{ID}-U_{ID}}$$

When a user wishes to be able to receive conditional access content from a given operator, the multimedia unit of this user and this operator have to be paired. To this aim, the user transmits the identifier $U_{ID}$ of their multimedia unit to the operator. Generally, when the invention is implemented in a broadcast type communication system, there is no automatic communication channel or feedback channel from the multimedia unit towards the operator. The transmission of the multimedia unit identifier to the operator is thus made by the user. This transmission can be made for example by telephone, the user indicating an identifier which can be printed on a physical support such as the multimedia unit, a separately delivered printed document or a smart card for example. As previously indicated, the transmission of the multimedia unit identifier can be also made by other means, and in particular by a feedback channel if a feedback channel is available.

When the identifier of the multimedia unit is transmitted to the operator, the latter can calculate the pairing key $K_{O_{ID}-U_{ID}}$ defined by the previously described method. The operator can thus send, by the broadcast channel, its identifier $O_{ID}$ in order to allow the multimedia unit to calculate the same pairing key $K_{O_{ID}-U_{ID}}$. This pairing key can then be used for encrypting the messages and sending them to the multimedia unit, so that only this multimedia unit be able to decrypt them.

According to a first embodiment, the pairing key can be used for encrypting the messages containing rights, such as management messages EMM (Entitlement Management Message) or a transmission key. In order to reduce the exposure of the pairing key, according to another embodiment, the pairing key is used to transmit in a secure manner, a master key, the latter being used to encrypt the messages containing rights, such as management messages EMM (Entitlement Management Message) or a transmission key. This reduces the occurrence of using the pairing key.

Knowing the identifiers $U_{ID}$ of all the multimedia units to which the operator wants to send content, it is sufficient now that the operator conventionally distribute content keys as well as rights in order to allow these units to decrypt the conditional access data transmitted on the operator's channel. The way to manage the conditional access is known from the state of the art and is not described later on.

In the example illustrated in FIG. 1, the operator having the identifier $O_1$ has the identifiers $U_1$ and $U_2$ which correspond respectively to the multimedia units $STB_1$, and $STB_2$ to which this operator can send content keys and conditional access data. The operator having the operator identifier $O_2$ knows the identifier $U_3$ of the multimedia unit $STB_3$ to which it can send content keys and conditional access data and the operator having the operator identifier $O_3$ knows the identifiers $U_1$ and $U_3$ of the multimedia units $STB_1$ and $STB_3$ to which this operator $Op_3$ can send content keys and conditional access data.

These multimedia unit identifiers can be public and their knowledge does not give any information to a person desiring to test the security of the system, by way of the properties of the cryptographic functions allowing the calculation of the keys.

In a similar way, the multimedia unit having the identifier $U_1$ knows the identifiers $O_1$ and $O_3$ of the operators from which it can obtain conditional access data; the multimedia unit $STB_2$ having the identifier $U_2$ knows the identifier $O_1$ of the operator from which this unit can obtain conditional access data and the multimedia unit having the identifier $U_3$ has the identifiers $O_2$ and $O_3$ of the operators from which this unit can obtain conditional access data.

In this case as well, the operator identifiers do not constitute sensitive information and the transmission of these identifiers to the concerned multimedia units can be done in an unencrypted or encrypted way, without great attention being necessary to the encryption process used.

Once the operators have received the identifiers $U_{ID}$ of the multimedia units they have to be paired with, they calculate the respective pairing keys $K_{O_{ID}-U_{ID}}$ by applying the operator function $g_2$ to the couple "operator key $KO_{ID}$-multimedia unit identifier $U_{ID}$".

In a symmetrical way, once the multimedia units have received the identifiers $O_{ID}$ of the operators they have to be paired with, they calculate the respective pairing keys $K_{O_{ID}-U_{ID}}$ by applying the multimedia unit function $g_1$ to the couple "Multimedia unit key $KU_{ID}$-operator identifier $O_{ID}$".

All the couples operator-multimedia unit thus have a key which is specific to each couple and is common to the two elements of the couple.

The pairing key calculated between a given operator and a given multimedia unit could be directly used to encrypt content to be transmitted from the operator to the related multimedia unit. In practice, this is however not generally done. In the context of a broadcast-type transmission, the content is encrypted by control words which are identical for a set of multimedia units. As the pairing key is different for each couple operator-multimedia unit, it cannot be used for encrypting contents in an identical way for several multimedia units.

Figure 2:
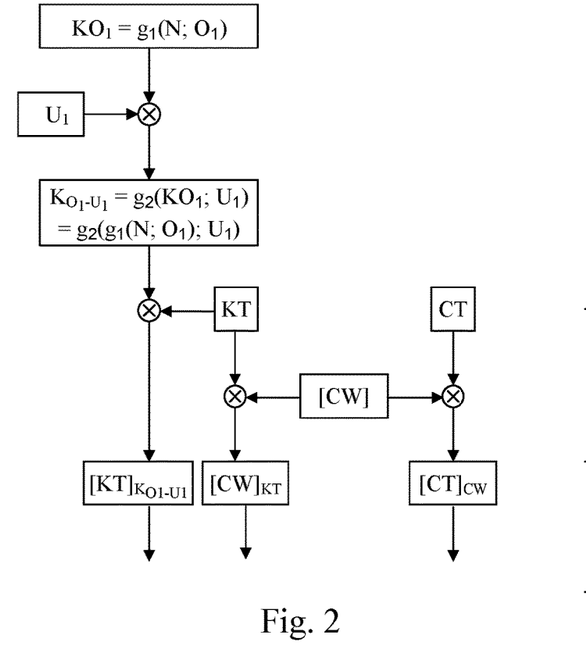
FIG. 2 shows, in the form of block diagram, an encryption method according to one aspect of the invention.

In practice, in a broadcast-type transmission mode and as shown in FIG. 2, conditional access data CT is encrypted by means of control words CW, independently of the multimedia units to which this data is intended. This encrypted data is then transmitted in such a way that at least the multimedia units to which this data is intended may receive them.

The control words are in turn encrypted by a transmission key KT and transmitted at least to the concerned multimedia units. Finally, the transmission key is encrypted by means of a key specific to each multimedia unit and more specific, to each couple operator—multimedia unit. This key can be the pairing key between the operator and the multimedia unit or a key derived from this pairing key.

Figure 3:
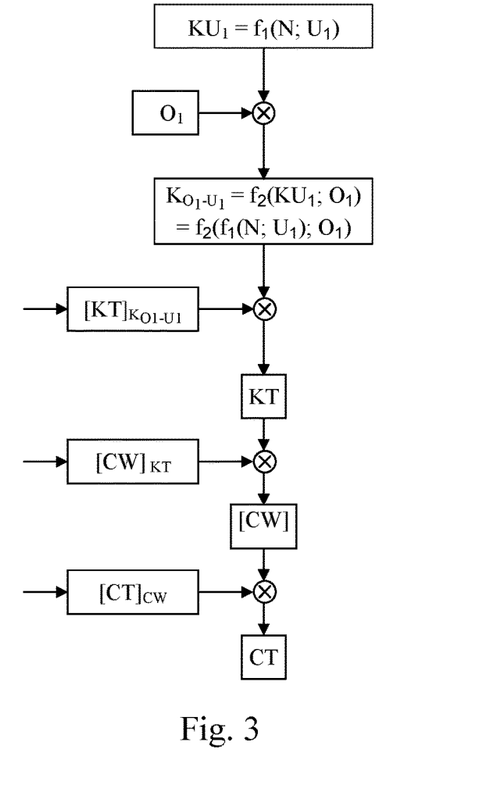
FIG. 3 is a block diagram representing the decryption method according to one aspect of the present invention.

The decryption is shown in FIG. 3. A multimedia unit receives conditional access data CT encrypted by control words CW, messages containing at least one control word and encrypted by a transmission key KT and messages containing at least one transmission key and encrypted by a key specific to the couple operator—multimedia unit. The latter key can be the pairing key or a key derived from it.

To access the conditional access data in clear, the multimedia unit calculates, by calculation means of this multimedia unit, the pairing key by means of the multimedia unit function $KU_1$ and the operator identifier $O_1$. This pairing key allows access to the transmission key KT, which allows to obtain the control words CW. These control words CW can then be used for decrypting the conditional access data.

In a point-to-point transmission mode for example, the pairing key or a key derived from it could be used for directly encrypting contents.

As previously indicated, the functions used within the context of the invention meet the following conditions:

If $U_{ID}$ and $KU_{ID}=f_1(N; U_{ID})$ are known, it is not possible to calculate N If $O_{ID}$ and $KO_{ID}=g_1(O_{ID}; N)$ are known, it is not possible to calculate N Regardless of the number of known couples $(U_{ID}; g_1(N; O_{ID}))$ and $(O_{ID}; f_1(N; U_{ID}))$, it is difficult to calculate $KU_{ID}$ (respectively $KO_{ID}$) for a different $U_{ID}$ (resp. $O_{ID}$).

$g_2(g_1(N; O_{ID}); U_{ID})=f_2(f_1(N; U_{ID}); O_{ID})$

Among the mathematic functions which fulfil these conditions, there is in particular a modular exponentiation function. Such a function can be expressed in the following way:

$$f(a,b)=a^{H(b)} \bmod m$$

where a and b are the entry variables of the function, h is a cryptographic hash function and m is the product of two large prime numbers p and q.

Such an exponentiation function can be used for calculating the operator key $KO_{ID}$ from the personalization key N and the operator identifier $O_{ID}$. We have:

$$KO_{ID}=g_1(N;O_{ID})=N^{H(O_{ID})} \bmod m$$

It should be noted that the number m is known by the multimedia units as well as by the operators. However, they do not have to know p and q.

A similar function can be used for calculating the multimedia unit key $KU_{ID}$ from the personalization key N and the multimedia unit identifier $U_{ID}$. We have:

$$KU_{ID}=f_1(N;U_{ID})=N^{H(U_{ID})} \bmod m$$

where the value of m used in this formula is identical to the value of m as defined above.

Generally, we may use $$f_1(a;b)=f_2(a;b)=g_1(a;b)=g_2(a;b)=a^{H(b)} \bmod m$$

$$g_2(KO_1;U_1)=KO_1^{H(U_1)} \bmod m$$

It can be shown that when using such a modular exponentiation, we will have $$g_2(KO_1;U_1)=KO_1^{H(U_1)} \bmod m$$

By replacing $KO_1$ by $g_1(N; O_1)=N^{H(O_1)} \bmod m$, we have:

$$g_2(KO_1;U_1)=KO_1^{H(U_1)} \bmod m=[N^{H(O_1)} \bmod m]^{H(U_1)} \bmod m$$

In a similar way, $$f_2(KU_1;O_1)=KU_1^{H(O_1)} \bmod m$$

By replacing $KU_1$ by $f_1(N; U_1)=N^{H(U_1)} \bmod m$ we have:

$$g_2(g_1(N;O_{ID});U_{ID})=f_2(f_1(N;U_{ID});O_{ID})$$

As $[N^{H(O_1)} \bmod m]^{H(U_1)} \bmod m=[N^{H(U_1)} \bmod m]^{H(O_1)} \bmod m$ we have:

$$g_2(g_1(N;O_{ID});U_{ID})=f_2(f_1(N;U_{ID});O_{ID})$$

More generally, the mathematical functions which can be used to reach the desired result are the so-called quasi-commutative functions. The functions f and g are called quasi-commutative if:

$$f(g(x;y_1);y_2)=g(f(x;y_2);y_1)$$

where "=" means equal almost everywhere or in other words, equal except for a finite number of values.

The pairing method according to the invention allows to pair a multimedia unit with one or more operators by exchanging only public data among each other. This method allows to calculate a pairing key both in the multimedia unit and at the operator. The knowledge of the secrets of an operator has no influence on the security of the other operators.

In this way, the number of multimedia units with which an operator can communicate is practically unlimited and the generation of the keys is done in an efficient way, with no need to transmit a large number of unnecessary keys or with no need to wait for a long time before the multimedia unit works.

Figure 4:
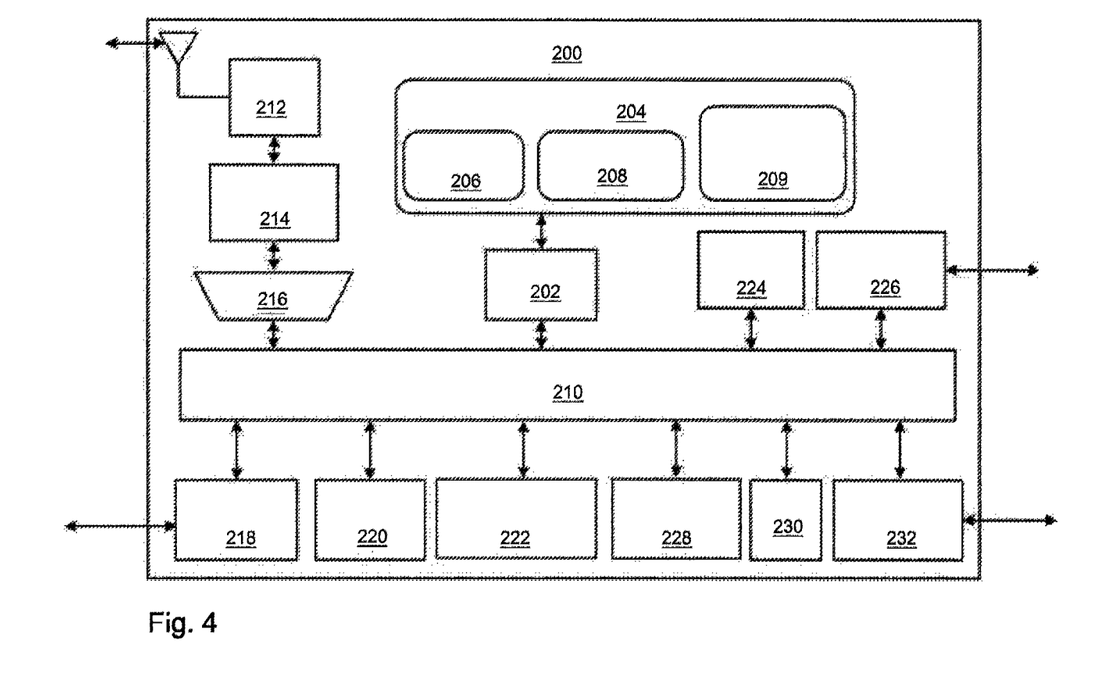
FIG. 4 illustrates a multimedia unit to execute the present method.

For the purpose of executing the present disclosure, the multimedia unit STB, and more generally a computing device 200 is illustrated in the FIG. 4.

FIG. 4 is a block diagram illustrating an example of a multimedia unit that may implement one or more techniques of this disclosure. Multimedia unit 200 is an example of a multimedia unit that may be configured to transmit data to and receive data from a communications network, allow a user to access multimedia content, and execute one or more applications. Multimedia unit 200 may include or be part of a stationary multimedia unit (e.g., a desktop computer, a television, a set-top box, a gaming console, a dedicated multimedia streaming device, a digital video recorder, etc.), a portable multimedia unit (e.g., a mobile phone, a laptop, a personal data assistant (PDA), a tablet device, a portable gaming device, etc.) or another type of multimedia unit. In the example illustrated in FIG. 4, multimedia unit 200 is configured to receive data via a television network, such as, for example, television network 106 or NT1 described above and send and receive data via a data network, such as, for example, a public or local network 108 or LNT. It should be noted that in other examples, multimedia unit 200 may be configured to send and receive data through one of television network 106 or local network 108. The techniques described herein may be utilized by devices configured to communicate using any and all combinations of communications networks.

As illustrated in FIG. 4, multimedia unit 200 includes central processing unit(s) 202, system memory 204, system interface 210, modem 212, transport module 214, audio-video de-multiplexer (AVdemux) 216, network interface 218, storage device(s) 220, user interface(s) 222, audio decoder 224, audio processor 226, video decoder 228, graphics processing unit 230, and display processor 232.

As illustrated in FIG. 4, system memory 204 includes operating system 206, applications 208, and content selection application 209. Each of central processing units(s) 202, system memory 204, system interface 210, modem 212, transport module 214, AV demux 216, network interface 218, storage device(s) 220, user interface(s) 222, audio decoder 224, audio processor 226, video decoder 228, graphics processing unit 230, and display processor 232 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example multimedia unit 200 is illustrated as having distinct functional blocks, such an illustration is for descriptive purposes and does not limit multimedia unit 200 to a particular hardware architecture. Functions of multimedia unit 200 may be realized using any combination of hardware, firmware and/or software implementations. In some examples, functionality of multimedia unit 200 may be implemented using one or more so-called systems on a chip (SOC). For example, multimedia unit 200 may include a set-top box including a SOC. One example of a commercially available SOC that may be included in a set-top box is the Broadcom®BCM7252 Ultra HD SoC. Central processing unit(s) 202 may be configured to implement functionality and/or process instructions for execution in multimedia unit 200. Central processing unit(s) 202 may be capable of retrieving and processing instructions, code, and/or data structures for implementing one or more of the techniques described herein. Instructions may be stored on a computer readable medium, such as system memory 204 or storage device(s) 220. Central processing unit(s) 202 may include multi-core central processing units. As described in detail below, the techniques described herein may be used to optimize CPU usage. For example, one or more background processing techniques may be used to reduce the delay (or lag) experienced by a user interacting with one of the graphical user interfaces described below.

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System memory 204 may be configured to store information that may be used by multimedia unit 200 during operation. System memory 204 may be used to store program instructions for execution by central processing unit(s) 202 and may be used by software or applications running on multimedia unit 200 to temporarily store information during program execution. For example, system memory 204 may store instructions associated with operating system 206, applications 208, and content selection application 209. System memory 204 may include one or more distinct memory devices, where each memory device may include a distinct type of memory interface. For example, system memory 204 may include an internal hard disk or solid state drive, a random access memory module, an embedded MultiMediaCard (eMMC) memory device, and/or one or more caches (e.g., CPU caches and/or GPU caches). As described in detail below, images associated with a graphical user interface may be loaded from a portion of system memory 204 to another portion of system memory 204 in order to reduce the time required to render the images on a display based on received user inputs. For example, a subset of images associated with a graphical user interface may be loaded into a cache based on user behavior. It should be noted that the techniques described herein may be generally applicable to any memory architecture.

Applications 208 and content selection application 209 may include applications implemented within or executed by multimedia unit 200 and may be implemented or contained within, operable by, executed by, and/or be operatively/communicatively coupled to components of multimedia unit 200.

Applications 208 and content selection application 209 may include instructions that may cause central processing unit(s) 202 of multimedia unit 200 to perform particular functions. Applications 208 and content selection application 209 may include algorithms which are expressed in computer programming statements, such as, for-loops, while-loops, if-statements, do-loops, etc. Applications 208 and content selection application 209 may be distributed to multimedia unit 200 through an application distribution site, for example, application distribution site 122. In one example, applications 208 and content selection application 209 may cause multimedia unit 200 to perform functions associated with the example techniques described herein that enable a user to access items of content. Applications 208 and content selection application 209 may cause one or more graphical user interfaces to be presented that enable a user to provide data for use by an application. In one example, applications 208 may include one or more dedicated applications enabling a user to access a digital media service. It should be noted that as used herein a dedicated application enabling a user to access a digital media service may be high integrated with an application or operating system of a multimedia unit.

For example, a set-top box supported by a cable television provider may enable a user to access items of content from a television service, an on demand media service maintained by the cable television service provider, and/or a third party media streaming service. In some cases, each distinct graphical user interface enabling a user to select items of content to access may be referred to as a dedicated application, a source, and/or a portal. In one example, content selection application 209 may be provided to a multimedia unit and cause a multimedia unit to enable a user to select items of content according to one or more of the techniques described herein.

As described in detail below content selection application 209 may operate in conjunction with an application running on a companion device, such as a mobile device.

As further illustrated in FIG. 4, applications 208 and content selection application 209 may execute in conjunction with operating system 206. That is, operating system 206 may be configured to facilitate the interaction of applications 208 and content selection application 209 with central processing unit(s) 202, and other hardware components of multimedia unit 200. It should be noted that in some examples, components of operating system 206 and components acting in conjunction with operating system 206 may be referred to as middleware. Further, in some examples, content selection application 209 may include an application programming interface (API). The techniques described herein may be utilized by devices configured to operate using any and all combinations of software architectures. Operating system 206 may be an operating system designed to be installed on laptops, desktops, smartphones, tablets, set-top boxes, digital video recorders, televisions and/or gaming devices. In one example, operating system 206 may include one or more of operating systems or middleware components developed by OpenTV®, Windows® operating systems, Linux operation systems, Mac OS®, Android® operating systems, and any and all combinations thereof.

System interface 210 may be configured to enable communications between components of multimedia unit 200. In one example, system interface 210 comprises structures that enable data to be transferred from one peer device to another peer device or to a storage medium. For example, system interface 210 may include a chipset supporting Accelerated Graphics Port (AGP) based protocols, Peripheral Component Interconnect (PCI) bus based protocols, such as, for example, the PCI Express (PCIe) bus specification, which is maintained by the Peripheral Component Interconnect Special Interest Group, or any other form of structure that may be used to interconnect peer devices.

Storage device(s) 220 represent memory of multimedia unit 200 that may be configured to store relatively larger amounts of information for relatively longer periods of time than system memory 204. For example, in the example where multimedia unit 200 is included as part of a digital video recorder, storage device(s) 220 may include a hard disk drive configured to store numerous video files. Similar to system memory 204, storage device(s) 220 may also include one or more non-transitory or tangible computer-readable storage media. Storage device(s) 220 may include internal and/or external memory devices and in some examples may include volatile and non-volatile storage elements.

User interface(s) 222 may include devices configured to receive input from a user during operation of multimedia unit 200. For example, user interface(s) 222 may include buttons and switches, motion sensors (e.g., accelerometers), touch-sensitive sensors, a track pad, a mouse, a keyboard, a microphone, a video camera, or any other type of device configured to receive user input. User interface(s) 222 may be integrated into multimedia unit 200. For example, in the case where multimedia unit 200 includes a television, user interface(s) 222 may include push buttons located on the television. Further, user interface(s) 222 may be integrated into devices external to multimedia unit 200. For example, user interface(s) 222 may be integrated into a companion device, such as, for example, companion device 300 and companion device 400 described in detail below. In some examples, an external device including user interfaces(s) 222 may be operatively coupled to multimedia unit 200 using a standardized communication protocol, such as for example, Universal Serial Bus protocol (USB), Bluetooth, ZigBee or a proprietary communications protocol, such as, for example, a proprietary infrared communications protocol. It should be noted that techniques described herein may be generally applicable regardless of the type of device including a user interface and regardless of the manner in which the device communicates with multimedia unit 200. As described in detail below, user interface(s) 222 may include a display configured to display the graphical users interfaces described herein. For example, in the case where multimedia unit 200 includes a television, a companion device (e.g., a smart phone or a dedicated remote controller) in communication with a television may include a user interface including a touch-sensitive display presenting a graphical user interface described herein. Further, as described in detail below, a user may provide commands to multimedia unit 200 by activating portions of a touch-sensitive display.

Referring again to FIG. 4, multimedia unit 200 is configured to send and receive data via a local network, such as, for example, television network 106 described above and send and receive data via a public network, such as, for example, public network 108. This network is used also to transmit and receive data from the mobile device. A communications network may be described based on a model including layers that define communication properties, such as, for example, physical signaling, addressing, channel access control, packet properties, and data processing in a communications system. In the example illustrated in FIG. 4, modem 212, transport module 214, and AV demux 216 may be configured to perform lower layer processing associated with television network 106 and network interface 218 may be configured to perform lower layer processing associated with public network 108.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method for pairing a computing device with an operator device to communicate encrypted conditional access data, the method comprising:
receiving, at the computing device, a first key for the computing device, the first key being formed based on applying a first cryptographic function using a second key and an identifier for the computing device as input parameters;

obtaining, at the computing device, an identifier associated with the operator device;

generating, by one or more processors of the computing device, a third key, the third key being generated based on applying a mathematical function using the identifier associated with the operator device and the first key for the computing device as input parameters;

receiving, at the computing device, an encrypted transmission key, encrypted control words, and the encrypted conditional access data from the operator device, wherein the encrypted transmission key has been encrypted using a fourth key that is identical to the third key and has been generated based on applying a second mathematical function using the identifier for the computing device and a further key associated with the operator device as input parameters;

decrypting, by the one or more processors of the computing device, the encrypted transmission key using the third key, thereby obtaining a decrypted transmission key;

decrypting, by the one or more processors of the computing device, the encrypted control words using the decrypted transmission key, thereby obtaining decrypted control words, and decrypting, by the one or more processors of the computing device, the encrypted conditional access data using the decrypted control words, thereby obtaining decrypted conditional access data.

2. The method of claim 1, wherein the computing device is a smartphone, a tablet, a desktop computer, a television, a set-top box, a gaming console, a streaming device, or a digital video recorder.

3. The method of claim 1, wherein the mathematical function for generating the third key includes modular exponentiation using the first key as base and using a hash function applied to the identifier associated with the operator device as exponent.

4. The method of claim 1, wherein the computing device receives the first key from a personalization entity, wherein said personalization entity generates the first key by applying the first cryptographic function using the second key and the identifier for the computing device as input parameters, and wherein the second key is not furnished to the computing device.

5. The method of claim 4, wherein the first cryptographic function for generating the first key includes modular exponentiation using the second key as base and using a further hash function applied to the identifier for the computing device as exponent.

6. The method of claim 3, wherein the fourth key is generated by the operator device by applying a second mathematical function using the identifier for the computing device and a further key associated with the operator device as input parameters.

7. The method of claim 6, wherein the second mathematical function includes modular exponentiation using the further key as base and using a further hash function applied to the identifier for the computing device as exponent.

8. The method of claim 6, wherein the operator device receives the further key from a personalization entity, wherein said personalization entity generates the further key by applying a second cryptographic function using the second key and the identifier for the operator device as input parameters, and wherein the second key is not furnished to the operator device.

9. The method of claim 8, wherein the second cryptographic function for generating the further key includes modular exponentiation using the second key as base and using the hash function applied to the identifier for the operator device as exponent.

10. The system of claim 1, wherein the computing device is a smartphone, a tablet, a laptop, a desktop computer, a television, a set-top box, a gaming console, a streaming device, or a digital video recorder; and the operator device is part of a communication network.

11. A computing device configured to be paired with an operator device to communicate encrypted conditional access data, the computing device comprising:

one or more processors; and a memory accessible to the one or more processors and storing instructions which, upon execution by the one or more processors, cause the one or more processors to perform operations comprising:

receiving a first key for the computing device, the first key being formed based on applying a first cryptographic function using a second key and an identifier for the computing device as input parameters;

obtaining an identifier associated with the operator device;

generating a third key, the third key being generated based on applying a mathematical function using the identifier associated with the operator device and the first key for the computing device as input parameters;

receiving, at the computing device, an encrypted transmission key, encrypted control words, and the encrypted conditional access data from the operator device, wherein the encrypted transmission key has been encrypted using a fourth key that is identical to the third key and has been generated based on applying a second mathematical function using the identifier for the computing device and a further key associated with the operator device as input parameters;

decrypting the encrypted transmission key using the third key, thereby obtaining a decrypted transmission key;

decrypting the encrypted control words using the decrypted transmission key, thereby obtaining decrypted control words, and decrypting the encrypted conditional access data using the decrypted control words, thereby obtaining decrypted conditional access data.

12. The system of claim 11, wherein the computing device is a smartphone, a tablet, a laptop, a desktop computer, a television, a set-top box, a gaming console, a streaming device, or a digital video recorder; and the operator device is part of a communication network.

* * * * *